UNITED STATES PATENT OFFICE.

ROBERT HARE, OF PHILADELPHIA, PENNSYLVANIA.

PREPARATION OF ANIMAL AND OTHER MANURE.

Specification forming part of Letters Patent No. 7,053, dated January 29, 1850.

*To all whom it may concern:*

Be it known that I, ROBERT HARE, of the city and county of Philadelphia and State of Pennsylvania, have invented a new and useful Concentrated Manure; and I do hereby declare the following to be a full, clear, and exact description thereof, and of the manner of preparing and using the same for fertilizing land.

My invention has for its object to procure a concentrated nitrogenous manure as an artificial substitute for guano. In preparing this I make use of such organic substances as have hitherto, if employed at all as manures, involved the production of naseous effluvia and the loss of a great part of their substance by the escape of the gaseous compounds of ammonia. Besides producing a valuable manure from the offals of slaughter-houses, fisheries, manufactories for extracting oil from fish or flesh, &c., my invention converts to a useful purpose the flesh of such animals as do not ordinarily constitute the food of man—such as horses, mules, dogs, rapacious beasts, birds, and fish.

The carcasses of porpoises, sharks, dogfish, white-fish, and many others are now occasionally thrown upon land as manure, either before or after extracting their oil; but this can be profitably done only when they can be obtained within a moderate distance of the ground to be manured. For want of suitable means for preventing putrefaction, and of reducing their bulk and weight so as to diminish the expense of conveyance, they can bear transportion inland but for a short distance. Their employment is moreover attended by the evolution of a fetor so offensive as to become a nuisance to the neighborhood. Highly-nitrogenized vegetable substances having a composition similar to that of animal bodies may, in some cases, be substituted for them and subjected to the processes hereinafter described for producing concentrated manures.

My processes may be described as follows:

First. Putrefiable organic materials containing nitrogen (especially flesh, fish, or the entrails and offals of animals) are subjected to concentrated sulphuric acid, or are mingled with various sulphates, nitrates, or chlorides, especially the sulphates of iron, lime, soda, or potash, or the nitrate of potash or soda. The proportions which I use are so regulated as to have the acid, whether free or combined, in a ratio varying from one-fifth to one-tenth of the weight of the flesh or fish. The acid or salt, acting as an antiseptic, secures the flesh or fish from decomposition. If the acid be free or be held to its base by an inferior affinity, (as in the sulphate of iron,) it secures the nitrogenous portion of the organic materials from becoming the food of worms or from flying off in combination with hydrogen in the state of ammonia, or in the winged insects generated from the worms. Among the antiseptics employed is a mixture of sulphuric acid, nitrate of soda, and dry tan, or sawdust, the first two ingredients being allowed to react before the addition of the ligneous matter. Besides preventing or arresting putrefaction, another faculty with which the antiseptic acids, salts, or mixtures are endowed is to fix all the fertilizing products existing in the organic substances, even when subjected to a temperature sufficient to remove water, thereby allowing the materials to be quickly dried without spoiling, and to be reduced in weight and bulk so as to be transported and applied with less expense than when in the moist state.

Second. When the manure is to be long kept, or is designed to be transported to a great distance, I subject the aforesaid organic substances, after having been treated with the antiseptic acids, salts, or mixtures above described, to desiccation by means of a boiler, oven, kiln, or drying or smoking house for a time sufficient to vaporize the moisture which they contain, the removal of which not only renders them lighter, but makes them more friable than before, so as to be readily pulverized by grinding or trituration, and thus renders them as easy of distribution over the soil as guano.

Third. In order to facilitate the union between the fleshy or other nitrogenous organic materials and the sulphuric acid, I use the acid in a concentrated state, in which the flesh, &c., is boiled, whereby the nitrogenous parts are arrested and the aqueous elements are allowed to escape as steam. From this part of the process a gelatinous mass results, which I mingle with pulverulent matters, (either neutral substances or active fertilizers, as the case may be,) whereby the concentrated manure is made to acquire a state sufficiently pulverulent and divided to be conveniently and equably applied to the land. The substances which I regard as most suitable to be thus used for mingling with the jelly or paste are bone-dust, ground plaster, bone-black, coal-ashes, road-dust, dry loam, sawdust, dry tan, or powdered charcoal; but others may be employed when these are not at command.

Fourth. During the formation and mixing with pulverulent matter of the jelly or paste I add to it a portion of coal-tar, petroleum or mineral oil, wood-tar, pitch, or resin, whereby fetid effluvia, if any should be generated, are retained or neutralized.

Fifth. When no substance actually putrid exists among the organic matter to be converted into concentrated manure, I employ either quicklime or lime which has been used in purifying coal-gas to effect the desiccation of such materials, forming therewith a mortar, which may be hardened in the form of bricks or dumplings, and subsequently in the dry state broken up and applied to the land; but whenever putrefaction has commenced lime cannot be well used as an antiseptic, as it would by abstracting water cause the evolution of gaseous ammonia and the consequent loss of useful materials.

Sixth. In default of other antiseptics, oil of turpentine, coal-naphtha, petroleum, or mineral naphtha may be used to preserve organic substances designed for manure until they may be dried or mingled with loam or subjected to the antiseptics herein specified.

I am aware that sulphuric acid has been employed as a manure alone, and also to decompose bones for the purpose of procuring superphosphate of lime to be used as a manure. These applications of it I therefore do not claim.

What I claim as my invention, and desire to secure by Letters Patent, is—

1. The use of the mineral acids to act upon the soft parts of animals or upon azotous vegetable matter at temperatures varying according to circumstances, as herein set forth, for producing a concentrated manure.

2. The combination of the mineral acids with the different salts, as described, for modifying the antiseptic action of the acids on azotous materials and for rendering them pulverulent whether said azotous materials be animal or vegetable.

3. The combination of the mineral acids with wood-tar, coal-tar, or their equivalents, in the manner and for the purposes herein set forth.

ROBT. HARE.

Witnesses:
 WALTER R. JOHNSON,
 G. B. McGREGORY.